May 9, 1933.  G. R. MILTON  1,908,440
PRODUCTION OF PETROLEUM
Filed April 2, 1932
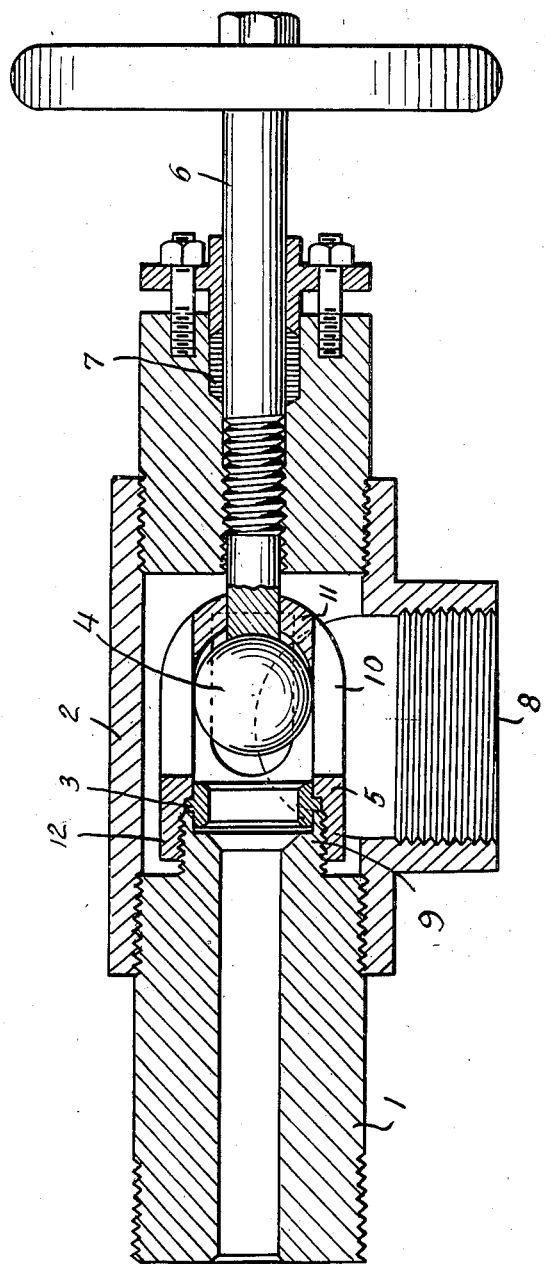
INVENTOR
George R. Milton
BY
Pennie, Davis, Marvin + Edmonds
ATTORNEYS Patented May 9, 1933

1,908,440

UNITED STATES PATENT OFFICE

GEORGE R. MILTON, OF SMITH COUNTY, TEXAS, ASSIGNOR TO SINCLAIR PRAIRIE OIL COMPANY, OF TULSA, OKLAHOMA, A CORPORATION OF MAINE

PRODUCTION OF PETROLEUM

Application filed April 2, 1932. Serial No. 602,756.

This invention relates to an improved beaner or valve for controlling flow from high pressure oil wells. In producing oil from pools in which the reservoir pressure is sufficient to force the oil through the well to the surface, important savings, with respect to operating costs and with respect to conservation of the oil content of the pool, can be effected by so controlling the flow of oil from the producing wells as to minimize the loss of gas pressure in, that is to minimize the release of gas from, the reservoir. Control involves the maintenance of back pressure on the reservoir, either at the surface or within the wells. Various expedients have been employed for this purpose. Nipples with fixed orifices have been used; such nipples must be replaced with others having orifices of different diameters to regulate the flow. At best, such nipples provide only step by step regulation and not continuous regulation. Various valve mechanisms have also been used and proposed for use. Such valve mechanisms provide continuous regulation, but in this service are subjected to unusually severe operating conditions. The velocities attained through such valve mechanisms are extreme in application to high pressure oil wells and the oil flowing through such valve mechanisms frequently includes entrained sand and the like. This invention provides an improved valve mechanism meeting the requirements of this service.

The improved beaner or valve of the invention will be described in connection with the accompanying drawing which illustrates, to scale, in section, one embodiment of the invention.

The beaner illustrated in the drawing comprises a nipple 1, a valve body 2, a removable seat member 3, a free ball closure member 4, a retaining member 5 and a ram 6 extending through the packing 7 in the valve body 2. The nipple 1 is connected to the well fittings and the outlet 8 from the valve body 2 to the collection system in the usual manner. The nipple 1 is provided with a reduced threaded portion 9 extending into the valve body 2 and the inner end of this extended portion 9 is shaped to receive the removable seat member 3. The retaining member 5, consisting of arms 10 connecting a collar 11 through which the ram 6 extends and an internally threaded collar 12, is threaded on the extended portion 9 of the nipple 1, the threaded collar 12 clamping the removable seat member 3 on the extended portion 9 of the nipple 1 and the arms 10 acting as guides to maintain the closure member 4 in the line of action of the ram 6. By means of the ram 6, comprising a threaded valve stem, the closure member 4 may be seated on the removable seat member 3 or may be permitted to move away from the seat member 3 to that limited extent appropriate to maintain the desired back pressure.

In the beaner illustrated, the valve body 2 and the retaining member 5 may be steel forgings, the nipple 1 may be of cold rolled steel, and the removable seat member 3 and the ball closure member 4 may be of hardened steel or of special alloy chosen for hardness, or the surface of the removable seat member 3 and of the ball closure member 4 may be nitrided.

The improved beaner or valve of this invention of which the embodiment illustrated in the drawing is one example comprises a valve body, a nipple, a removable seat member, a free ball closure member and a ram extending through the valve body. The nipple is threaded into the valve body and is also provided with a reduced threaded portion extending into the valve body and adapted to receive the removable seat member; the passage through the nipple extends through this extended portion. The retaining member, threaded on this extended portion of the nipple, is adapted to hold the seat member on the extended portion and to maintain the closure member in the line of action of the ram. By adjusting the ram, the motion of the closure member away from the seat member is limited to maintain the desired back pressure. The nipple and the retaining member are each thus made to serve a dual function. The nipple connects the beaner to the well fittings and also supports the removable seat member. The retaining member holds the removable seat member on the nipple and also guides the closure member. By making the closure member a free ball, wear of this element is minimized. However, both the closure member and the removable seat member are easily replaced.

The invention thus provides an improved beaner affording continuous regulation for controlling flow from high pressure oil wells in which wear and the effect of wear are minimized, in which those parts more particularly subject to wear are easily replaced, and which at the same time enjoys the advantage of simplicity.

I claim:

A valve for controlling flow from high pressure oil wells, comprising a valve body and a nipple threaded into said valve body, said nipple having a reduced threaded portion extending into said valve body and adapted to receive a removable seat member, the passage through said nipple extending through said extended portion, a removable seat member and a free ball closure member cooperating therewith, a retaining member threaded on said extended portion adapted to hold said seat member on said extended portion and to maintain said closure member in the line of action of the next-mentioned ram, and a ram extending through said valve body for limiting the motion of said closure member away from said seat member.

In testimony whereof I affix my signature.

GEORGE R. MILTON.